Feb. 9, 1932.   M. ALEX   1,844,268
WATER HEATER
Filed Jan. 10, 1930   2 Sheets-Sheet 1

Inventor
Max Alex
By Gabel & Bennings Attys

Feb. 9, 1932.  M. ALEX  1,844,268
WATER HEATER
Filed Jan. 10, 1930  2 Sheets-Sheet 2

Inventor
Max Alex
By: Gabel & Manning Attys.

Patented Feb. 9, 1932

1,844,268

UNITED STATES PATENT OFFICE

MAX ALEX, OF DAVENPORT, IOWA

WATER HEATER

Application filed January 10, 1930. Serial No. 419,877.

My invention relates to water heaters and has for its principal object the provision of a heater of this character by means of which a small supply of water may be maintained at a relatively high temperature for immediate use and by means of which immediate reaction of the heating element to a withdrawal of hot water and application of a fresh supply of cold water is obtained.

This invention is an improvement over that disclosed in my prior application Serial No. 282,435, filed June 2, 1928, for heaters, and embodies certain improvements thereover which I have found to be particularly successful for this purpose.

Another and more specific object of this invention is the provision in a heater of this character of a construction whereby all of the elements which may need to be investigated, repaired, or adjusted are carried by a single unit which also acts as a closure for the water containing chamber.

Another specific object of this invention comprises the improvement in the control element by means of which the water heater is turned off and on.

I will describe one form which my invention may take by reference to the accompanying drawings wherein—

Figure 1:
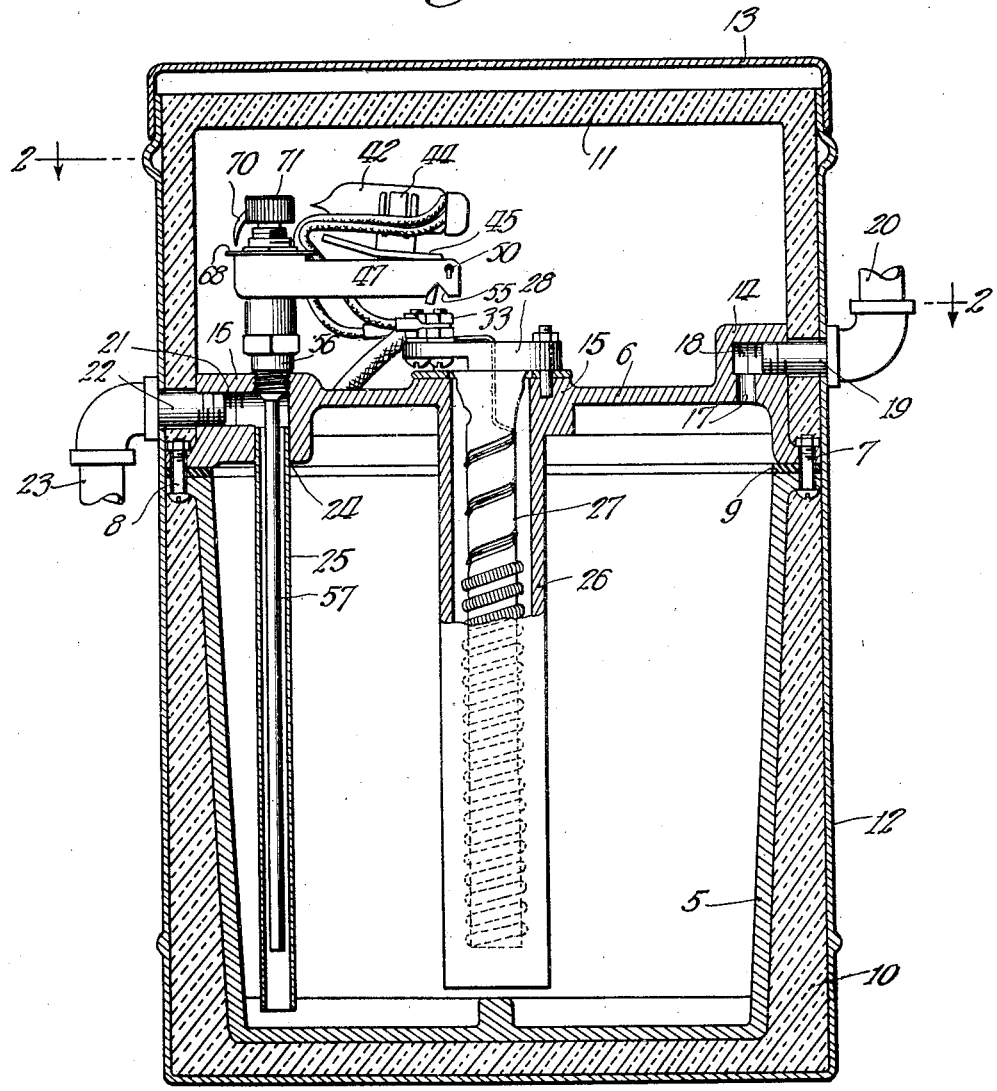
Fig. 1 is a vertical section through a water heater embodying my invention.
Figure 2:
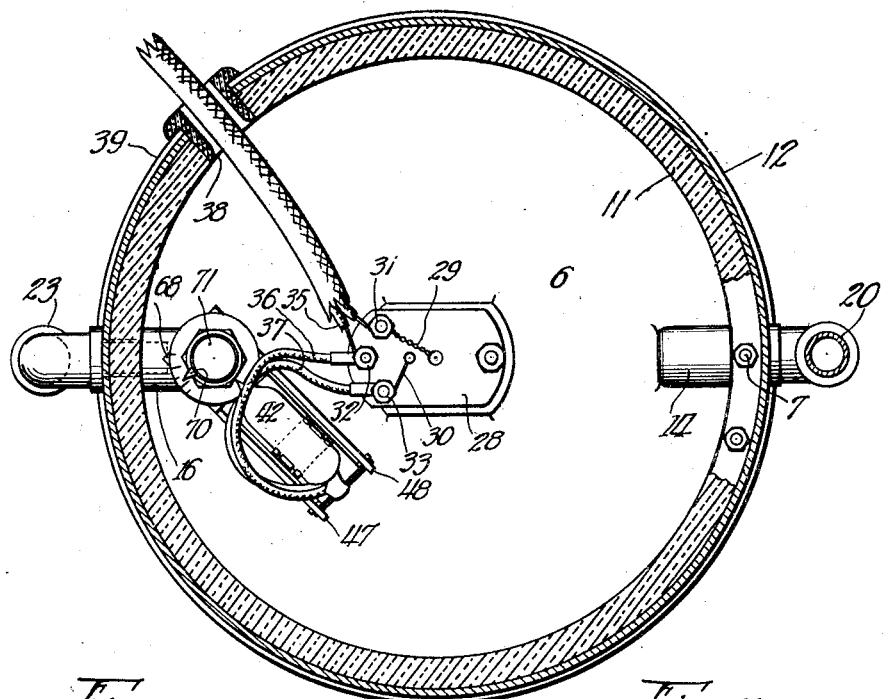
Fig. 2 is a section on the line 2—2 of Fig. 1.

Referring now in detail to the drawings, the water heater consists of a water container 5 which may be of any suitable form and which preferably is cast from a non-corrosive metal such as aluminum in the form shown. This container 5 is adapted to be closed at its top by means of a cover 6 which is secured thereto in any suitable manner such as by means of the screw bolts 7 and 8. A gasket 9 is used for making the joint between the cover and container water tight. The cover and container are then housed in a suitable insulating material indicated at 10 and 11, the two sections 10 and 11 preferably being made separate and adapted to receive the container and cover therein as shown clearly in Fig. 1. The entire apparatus then including the insulating cover is placed in an outer container 12 of a suitable sheet metal or other substance which will protect the insulating material and this container may be closed by a suitable cap 13.

All of the operating elements of the water heater including the water inlets and outlets are carried by the cover 6. This is accomplished by casting with the cover certain lugs or thickened portions at 14, 15, and 16, the thickened portion 14 being provided with an aperture at 17 communicating with the interior of the container 5 and a laterally extending bore 18 adapted to receive the pipe 19 leading to the outlet or faucet conduit 20. The enlarged portion 16 has a bore 21 receiving the pipe 22 of the inlet conduit 23 which may be connected to a suitable source of water supply. Bore 21 leads to the interior of the container 5 through an aperture 24 in which the tube 25 is secured. The tube 25 extends, as shown in Fig. 1, down substantially to the bottom of the container so as to bring the cold water into the container at the most remote point from the outlet which makes it necessary for the cold water to rise around the heater before it can reach the outlet conduit.

The enlarged portion 15 has cast integral therewith a tubular portion 26 extending down close to the bottom of the container 5 and closed at its lower end so as to securely protect the heater element 27 from any contact with the water in the container 5. This heater element may consist, as is common in the art, of a suitable insulating core having a resistance wire wound thereon in any suitable fashion. The top of the tubular member 26 is closed by means of an insulating cap 28 through which the leads 29 and 30 for the heater element extend. This insulating piece 28 carries a plurality of terminal screws such as 31, 32, and 33 for connecting the wire leads 34, 35, 36, and 37 thereto, the leads 35 and 36 being connected to the terminal 32, the leads 29 and 34 being connected to the terminal 31, and leads 30 and 37 being connected to terminal 33.

Figure 3:
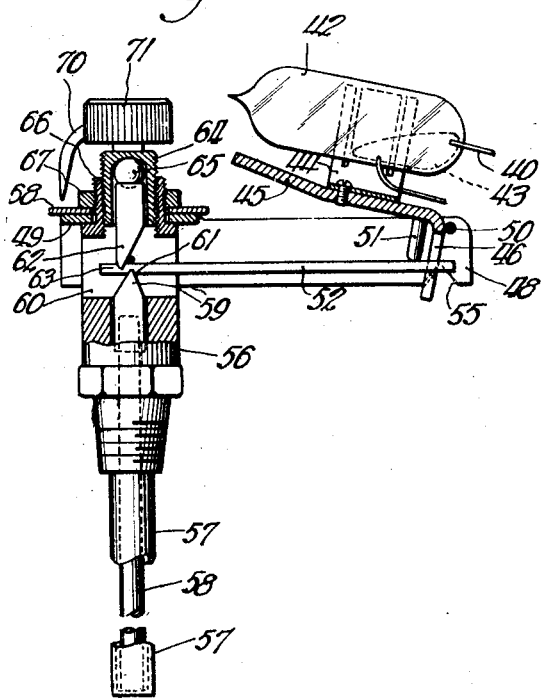
Fig. 3 is an enlarged sectional view of the control apparatus.
Figure 4:
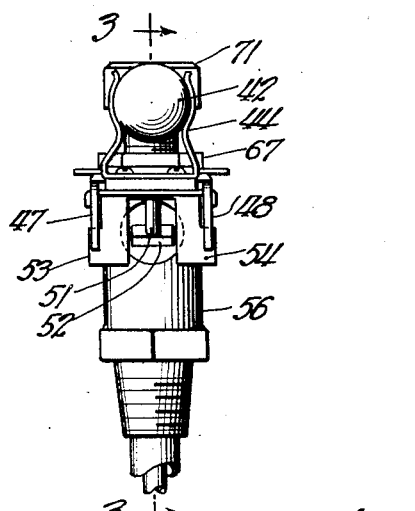
Fig. 4 is an end view taken on the left end of Fig. 3.

Leads 34 and 35 may lead to any suitable source of current supply through an aperture provided at 38 in the top insulating element 11 and the container 12 which aperture is preferably provided with a suitable porcelain bushing 39. Leads 36 and 37 extend to the terminals 40 and 41 of a mercury contact device 42 which consists of an evacuated bulb filled with a suitable non-oxidizing gas and having therein a body of mercury indicated at 43 which in one position of the bulb 42, namely that shown in Fig. 3, is adapted to connect the terminals 40 and 41 so as to permit current to flow therethrough to the heater element by way of lead 37, and lead 30; and which in another position, occasioned by tipping the tube 42 downwardly from the position shown in Fig. 3, breaks the circuit between the contacts 40 and 41 and thus deenergizes the heater.

The mechanism by means of which this mercury tube switch is operated will now be described. It will be noted that the tube 42 is supported on a suitable clip 44 which in turn is mounted upon an arm 45 which has a depending portion 46 extending down between the arms 47 and 48 of a frame member 49. The bar 50 extends across between the arms 47 and 48 adjacent the free ends thereof, and the member 45 is adapted to rest against this bar 50 which may be in the form of a roller to reduce the friction between it and the extension 46. The member 45 also has a depending pin 51 adjacent the extension 46 which pin is adapted to engage a bar 52 so that when the bar 52 is raised the member 45 will be tipped upwardly, and, as the bar 52 is lowered, member 45 will be permitted to tip downwardly to the left, as shown in Fig. 3, and bring the tube 42 into a more nearly horizontal position in which position the body of mercury will fail to connect contacts 40 and 41. The depending extension 46 has outwardly projecting portions at 53 and 54 cooperating with the notches 55 in the lower edges of the arms 47 and 48 to limit the upward movement of the extension 46, its downward movement being limited by the bar 50 and the pin 51.

The means for raising and lowering the bar 52 will now be described. It will be understood, of course, that if, when the temperature drops, the bar 52 is elevated to make contact between the terminals 40 and 41, and, if the temperature rises to the proper value desired within the container 5, bar 52 will be lowered sufficiently to break contact between the terminals 40 and 41, a definite temperature control will be had.

The enlargement 16 has screw threaded into the top thereof a supporting stem 56 which stem carries a metallic tube 57 having a fairly high temperature coefficient of expansion. I find that a copper tube is quite suitable for this purpose. This copper tube is closed at its lower end, as shown clearly in Fig. 3, and has suitably mounted therein so as to normally rest on the bottom thereof a metallic rod 58 which is preferably made of a material having a lower coefficient of heat expansion than the tube 57 and preferably having a comparatively small coefficient of heat expansion. I find that an iron rod is sufficiently accurate for this purpose and for the purpose of this invention.

This rod is slidably mounted within the member 56 and has at its upper end a wedged-shaped top portion 59 which projects into the opening 60 in the member 56 and engages a suitable notch at 61 in the bar 52. The bar 52 is then engaged by a sharp edged member 62 on its top surface as at notch 63 slightly to the left of the point of engagement with the wedged shaped portion 59 as shown in Fig. 3. The wedge-shaped member 62 is limited in its upward movement by the screw plug 64 and ball 65 bearing on the upper end thereof, screw plug 64 being screw-threaded into the nipple 66 projecting from the upper end of the member 56. This nipple 66 is both internally and externally screw-threaded as shown, and the member 49 is held in position by a nut 67 which clamps it down upon a shoulder at the base of the nipple 66. An indicating dial 68 is also held in position by means of the nut 67 and cooperates with a pointer 70 carried by the knurled head 71 of the plug 64 to serve as a means of indicating the limiting temperature for which the device is set.

The operation of the control is briefly as follows: Assuming that the device is in position as shown in Fig. 3, the rod 58 is resting on the bottom of the tube 57, and the bar 52 is in its lower limiting position for the present setting. Now the heater is on due to contact being made between the terminals 40 and 41 so that the temperature of the water in the container 5 will gradually be increased, the rate of course depending on the heat output of the heating element and the size of the container. The container illustrated in the present case is capable of holding approximately two gallons of water, although it may be made of different sizes as is obvious. As the temperature of the water increases, tube 57 will expand and become longer thus gradually permitting rod 58 to drop farther down, lowering its upper edge at 61 and permitting the free end of the bar 52 to also drop downwardly.

As this occurs, pin 51 follows the bar 52 downwardly, and as a result the support 45 tips downwardly to the left, and, when this action has continued far enough, the circuit between the contacts 40 and 41 is broken by the mercury being shifted to the left in the tube 42 at which time the heater will be turned off. The heater will remain turned off until the tube 57 is again cooled sufficiently either by the inlet of cold water or by the gradual reduction of the temperature of the water within the container to again force the bar 52 upwardly about the tip of the member 62 as a fulcrum and thus tip the member 45 upwardly to again make contact between 40 and 41. The position of the bar 52, and as a consequence the temperature at which the heater will be turned off, may be varied, of course, by moving the member 62 downwardly or upwardly through the medium of the screw plug 64; and, by suitably calibrating the indicating disc 68, the temperature may be set directly by the indications on this disc and the pointer 70, at which it is desired to maintain the water in the container 5.

The position of the tube 57 is, it will be clear from Fig. 1, such that immediately upon hot water being withdrawn through the outlet 20, the tube is subjected to the effect of the cold water rushing in from the inlet conduit 23 so that the heater will be turned on practically instantaneously when water is withdrawn from the container 5. This is particularly advantageous as it greatly increases the supply of hot water obtainable from such a device and also insures positive action by the heater circuit controlling switch at the time water is withdrawn from the heater.

I wish to call attention again to the fact that all of the parts which may be subjected to becoming out of order such as the heater, the control, and the inlet and outlet conduits, are carried upon a single element, namely the cover for the container, and carried in such fashion that they may all be examined, adjusted, or repaired without in any way disturbing the water-tight connection between the cover and the container 5.

Having thus described my invention, what I claim as new and desire to secure by Letters Patent is:

1. In an automatic water heater, a container, a cover for said container, said cover having inlet and outlet means whereby to pass water through said container, said cover also carrying an electric heating element, and control means also carried by said cover for controlling the supply of current to said element in response to the temperature of water in said container, said cover and container being separable without disturbing the parts carried by said cover, and said control means having a temperature responsive portion traversing said inlet means whereby to respond quickly to incoming water.

2. A control construction for water heaters and the like comprising a tubular heat responsive member fixed to the container at one end and located in the path of water entering the container, said member having its free end closed, a control bar slidably mounted in said tubular member and resting against said free end whereby more or less of said control bar will be housed in said tubular member as it expands or contracts, and means actuated by the movement of said control bar to control the supply of heat to said container, said means including a lever operated by the movement of said bar and a switch opened and closed by said lever.

3. A control construction for water heaters and the like comprising a tubular heat responsive member fixed to the container at one end and located in the path of water entering the container, said member having its free end closed, a control bar slidably mounted in said tubular member and resting against said free end whereby more or less of said control bar will be housed in said tubular member as it expands or contracts, and means actuated by the movement of said control bar to control the supply of heat to said container, said means including a lever movable in response to the movement of said bar and an adjustable fulcrum for said lever.

4. A control construction for water heaters and the like comprising a tubular heat responsive member fixed to the container at one end and located in the path of water entering the container, said member having its free end closed, a control bar slidably mounted in said tubular member and resting against said free end whereby more or less of said control bar will be housed in said tubular member as it expands or contracts, and means actuated by the movement of said control bar to control the supply of heat to said container, said means including a lever resting on the free end of said bar, a fulcrum for said lever, and a switch opened and closed by said lever.

5. A control construction for water heaters and the like comprising a tubular heat responsive member fixed to the container at one end and located in the path of water entering the container, said member having its free end closed, a control bar slidably mounted in said tubular member and resting against said free end whereby more or less of said control bar will be housed in said tubular member as it expands or contracts, and means actuated by the movement of said control bar to control the supply of heat to said container, said means including a lever resting on the free end of said bar, a fulcrum for said lever, and a switch controlled by said lever, said fulcrum being movable toward and away from the fixed end of said tubular member to vary the range of movement of said lever and thereby the temperature at which said switch is operated.

In witness whereof, I hereunto subscribe my name this 6th day of December, A. D. 1929.

MAX ALEX.